(12) United States Patent
Proidl

(10) Patent No.: US 6,944,625 B2
(45) Date of Patent: Sep. 13, 2005

(54) METHOD FOR CHARGING INFORMATION ABOUT AN ERROR IN A DATABASE

(75) Inventor: Adolf Proidl, Vienna (AU)

(73) Assignee: Koninklijke Philips Electronics N.V., Eindhoven (NL)

( * ) Notice: Subject to any disclaimer, the term of this patent is extended or adjusted under 35 U.S.C. 154(b) by 457 days.

(21) Appl. No.: 10/128,818

(22) Filed: Apr. 24, 2002

(65) Prior Publication Data

US 2003/0204521 A1 Oct. 30, 2003

(30) Foreign Application Priority Data

Apr. 5, 2001 (EP) ............................................ 01890128

(51) Int. Cl.⁷ .............................................. G06F 17/30
(52) U.S. Cl. .............................. 707/102; 707/1; 707/6; 707/202
(58) Field of Search ............................. 707/1, 6, 102, 707/202, 10, 100; 705/34; 709/203

(56) References Cited

U.S. PATENT DOCUMENTS

| | | | |
|---|---|---|---|
| 4,789,986 A | 12/1988 | Koizumi et al. | 714/797 |
| 5,806,075 A | 9/1998 | Jain et al. | 707/201 |
| 5,892,900 A * | 4/1999 | Ginter et al. | 713/200 |
| 5,966,717 A * | 10/1999 | Sass | 707/204 |
| 6,148,308 A * | 11/2000 | Neubauer et al. | 707/203 |
| 6,389,429 B1 * | 5/2002 | Kane et al. | 707/200 |

FOREIGN PATENT DOCUMENTS

| | | | | |
|---|---|---|---|---|
| WO | WO9634486 | 10/1996 | | H04N/1/00 |
| WO | WO0126287 | 4/2001 | | H04L/12/24 |

* cited by examiner

Primary Examiner—Greta Robinson
Assistant Examiner—Cheryl Lewis
(74) Attorney, Agent, or Firm—Gregory L. Thorne

(57) ABSTRACT

A target database (4) connected to the Internet (NET) is designed to gather entry data (EI) stored in source databases (1, 2, 3) similar in content, which source databases (1, 2, 3) are likewise connected to the Internet (NET). The target database (4) is designed to compare and enter retrieved entry date (EI) into a target memory module (20) of the target database (4), wherein a check is performed, according to the majority principle, as to which of the mutually deviating entry data (EI) are correct. The target database (4) is further designed to notify an administrator of the source data base (1, 2, 3) from which incorrect entry data (EI) were received.

24 Claims, 1 Drawing Sheet

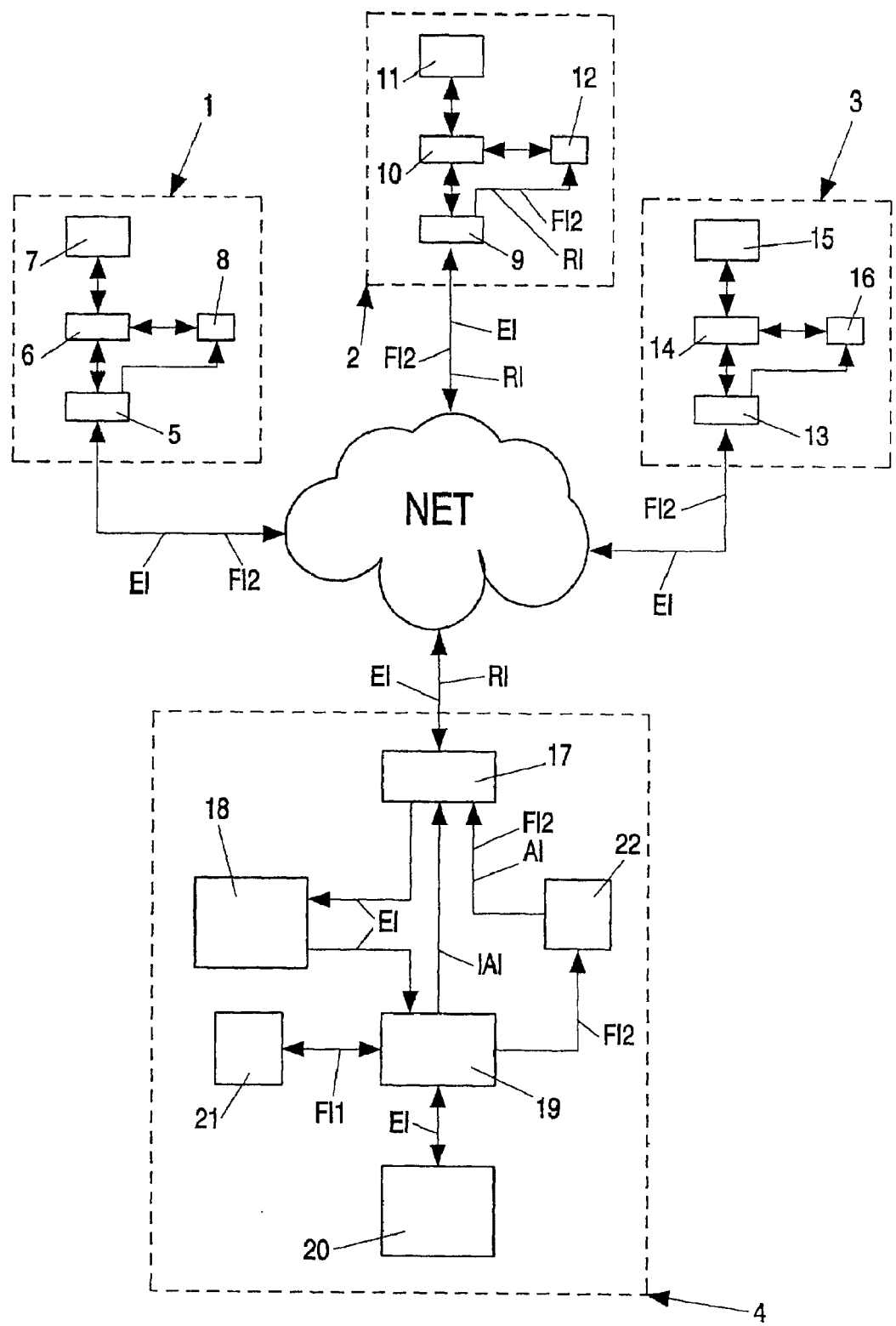

METHOD FOR CHARGING INFORMATION ABOUT AN ERROR IN A DATABASE

The invention relates to a method of gathering entry data for a target database from source databases similar to one another with regard to their entry data.

The invention further relates to a computer software product which takes the form of software run on a computer, which is designed to gather entry data stored in source databases and to enter selected entry data into a target database.

The invention further relates to a computer which runs the computer software product according to the preceding paragraph.

The invention further relates to a method of notifying an administrator of a database of incorrect data records in the database for which he/she is responsible.

Document WO 96/34486 discloses a system with a plurality of source databases, a target database and a computer, which runs software which is designed to gather entry data for the target database in accordance with the method described below and to notify the administrator of the target database of incorrect data records in the target database in accordance with the method described below. With the known system, the entry data take the form of program information stored in the source databases for an electronic program guide. The source databases and the target database contain data records, which in each case identify a television broadcast of a television station, as is conventional with electronic program guides. Data record entry identifiers, such as "station", "title" or "start time", identify the significance of each data record entry in the stored data records.

According to the known method of gathering entry data, program information is received from a first source database in a checking step and compared with program information already stored in the target database. Similar data records are looked for in the source database and the target database, which similar data records contain program information relating to the same television broadcast (e.g. station: ARD, date: 13 May 2001, start time: 16:00, title: Universum). These data records are only similar to one another and not identical, because one of the two data records may contain a data record entry (e.g. "A hare is . . . ") relating to a further data record identifier (e.g. "content"), or because one of the data record entries contained under the matching data entry identifiers may be incorrect. If no data record similar to a data record received from the source database can be found by the computer in the target database, this data record is stored in a difference database.

In an entry step, following the checking step, of the known method of gathering entry data, data records stored in the difference database are stored in the target database. These method steps are performed successively for all the source databases of the system, in order to store as many data records as possible relating to different television broadcasts in the target database and to be able to offer an extensive electronic program guide.

With the known method of notification of incorrect data records, the data records stored in the target database are checked for plausibility in a validity checking step. In this step, it is checked, for instance, whether the titles stored under the data record identifier "title" in the corresponding data record entries of the target database data records are too long. Errors in the target database detected during the validity checking step are entered in a check report, which forms an error flag. Once notified by the check report of incorrect data records in the target database, the administrator of the target database may make changes to the data record entries in the target database.

The known method of gathering entry data has the disadvantage that an incorrect data record entry in a source database is detected during the checking step as a difference between the correct data record entry in the target database and the incorrect data record entry in the source database and the correct data record in the target database is overwritten with the incorrect data record. According to the method of notifying the administrator of a database, the administrator of the target database is optionally notified of the incorrect data record in the target database, but has then to correct manually the data record already entered correctly once in the target database, which is time-consuming and cost-intensive.

It is an object of the invention to provide a method of gathering entry data of the type indicated in the first paragraph, a computer software product of the type indicated in the second paragraph and a computer of the type indicated in the third paragraph, with which the above-mentioned disadvantages are avoided.

To achieve the above-mentioned object, features according to the invention are provided for such a method of gathering entry data, such that the method may be characterized in the following way.

A method of gathering entry data for a target database, which contains data records with data record entries related to data record entry identifiers, from at least two source databases similar to one another in content, which source databases contain substantially the same entry data in data records with at least partially matching data record entry identifiers, the following steps being executed:

Reception of first data records from a first source database and of second data records from a second source database;

Tagging of similar first and second data records, which exhibit substantially matching data record entries for matching data record entry identifiers and thus substantially identify the same entry data;

Entry of data record entries contained in tagged similar first and second data records into a new data record in the target database, if matching data record entries for all matching data record entry identifiers are contained in the similar first and second data records;

Tagging of similar first and second data records as error data records, if the similar first and second data records comprise at least one different data record entry for a matching data record entry identifier;

Generation of a first error flag identifying the tagged error data records.

To achieve the above-mentioned object, features according to the invention are provided for such a computer software product, such that the computer software product may be characterized in the following way.

A computer software product, which may be loaded directly into the internal memory of a digital computer and comprises portions of software code, wherein the steps of the method as claimed in claim 1 are executed by the computer if the product is running on the computer.

To achieve the above-mentioned object, features according to the invention are provided for such a computer, such that the computer may be characterized in the following way.

A computer having an arithmetic unit and an internal memory, which runs the computer software product according to the previous paragraph.

In this way, the advantage is obtained that, due to the comparison of data records stored in the first source database and in the second source database performed prior to storing a data record in the target database, initially only those data records are stored in the target database which have matching data record entries for the same data record entry identifiers. Thus, storage of a data record with an incorrect data record entry is advantageously prevented. These data records entered automatically in the target database therefore have virtually never to be edited by the administrator of the target database, for which reason virtually no processing costs arise therefore.

Data records stored in the first source database and the second source database, which have stored matching data record entries for the same data record entry identifiers except for at least one data record entry identifier are tagged as error data records and a corresponding first error flag is generated. This first error flag may be passed on to the administrator of the target database in the form of an error report, and the administrator has then only to check the content of the error data records and decide which of the two tagged data records is correct and should be entered in the target database.

According to the measures of claim 2, the advantage is achieved that automatic checking is carried out as to which of the two data records tagged as error data records more probably contains correct data record entries, which are then entered in the target database—without manual involvement on the part of the administrator.

According to the measures of claim 6, the advantage is achieved that the computer executing the method of gathering entry data may actively search for source databases on the Internet and fully automatically retrieve and compare appropriate entry data. In this way, high-quality entry data may be fully automatically retrieved from source databases and assembled in the target database.

It may be mentioned that entry data may for example consist of price information relating to products, technical product data, customer data, date data or quality data. However, it has proven particularly advantageous for the method according to the invention to be used to gather and improve the quality of entry data in relation to program information for an electronic program guide.

To achieve the above-mentioned object, features according to the invention are provided for such a method of notifying an administrator about incorrect data records in the database for which he/she is responsible, such that the method may be characterized in the following way.

A method of notifying a source database administrator of incorrect data records in the source database for which he/she is responsible, wherein the following steps are executed:

Reception of at least first data records from a first source database, of second data records from a second source database and of third data records from a third source database;

Tagging of similar data records from the at least first, second and third data records which exhibit substantially matching data record entries for matching data record entry identifiers and thus substantially identify the same entry data;

Generation of a second error flag, if the majority of the data records tagged with regard to one item of entry data contain matching data record entries for all the matching data record entry identifiers, wherein the second error flag identifies at least one of the at least three data records as an incorrect data record, which comprise(s) at least one different data record entry compared with the other data records for matching data record entry identifiers of the tagged data records.

As claimed in claim 11, and also as claimed in claim 3, it is determined automatically which of the three data records containing substantially the same entry data comprises at least one incorrect data record entry. This incorrect data record is tagged with the second error flag. The data record entries contained in the other two data records not tagged with the second error flag and therefore very probably correct may advantageously be entered into the target database either automatically or after brief checking by the target database administrator.

In this way, the advantage is achieved that the target database administrator is clearly notified by the second error flag as to which data record is actually incorrect and which data record may be entered in the target database. Thus, storage of a data record with an incorrect data record entry is advantageously prevented with a very high level of probability.

It may be mentioned that similar data records may also be received from four, five or even more similar source databases, in order to establish which of the data records containing substantially the same entry data contains an incorrect data record entry. It is decided, in accordance with the majority principle, which data record comprises incorrect data record entries and is tagged as an error data record.

According to the measures of claim 4 and claim 12, the advantage is achieved that the source database administrator is pointed to an incorrect data record in the source database for which he/she is responsible and may repair the latter. The quality of the entry data of the database for which the administrator is responsible is therefore increased, for which reason more and more users will use this database. This larger number of database users has considerable advantages for the proprietors of the database either due to increased database utilization fees or due to increased advertising income.

According to the measures of claim 5 and claim 13, a business method is obtained, according to which an appropriate notification fee is charged for notification of incorrect data records in the source database. The proprietor of the source database will be happy to pay this notification fee, since, due to notification of incorrect data records in his/her source database, the proprietor is able to reduce the working time of the source database administrator, who no longer has to check the validity of the data records entered in the source database. In addition, the source database proprietor increases his/her revenue due to the improved quality of the entry data, as described above.

If a utilization fee has to be paid for retrieval of the source database data records, the source database proprietor and the target database proprietor could then agree to allow the source database data records to be retrieved by the target database administrator for free, no notification fee then being charged in return. In this way, the business method claimed in claims 5 and 13 would also be achieved.

The invention will be further described with reference to examples of embodiments shown in the drawings, to which, however, the invention is not restricted.

FIG. 1 shows a system consisting of three source databases and a target database, wherein an arithmetic module of the target database selects data records retrieved from the source databases and enters them in a target memory module of the target database.

FIG. 1 shows a system having a first source database 1, a second source database 2, a third source database 3 and a target database 4, which are connected together via the Internet NET. In the source databases 1, 2 and 3 there is stored program information from so-called electronic program guides in the form of entry data EI, which contain the television programs for a plurality of television stations for the next week for example. Each item of entry data EI here identifies a television broadcast, such as for example the film "Casablanca", which is to be broadcast at 17:00 on 13th May 2001 by the television station "ARD".

The first source database 1 comprises an interface 5, which comprises an Ethernet network adapter, which executes protocols (e.g. SMTP, HTTP) necessary for the communication of data over the Internet NET. Such an interface 5 has been known for a long time, for which reason it will not be examined in any more detail. An arithmetic module 6 of the first source database 1 is designed to fetch entry data EI stored in a memory module 7 of the first source database 1 and to feed the fetched entry data EI to the interface 5. An editing module 8 allows an administrator of the first source database 1 to edit the entry data EI fetched by the arithmetic module 6 from the memory module 7, if incorrect entry data EI are detected.

The second source database 2 contains an interface 9, an arithmetic module 10, a memory module 11 and an editing module 12 and the third source database 3 contains an interface 13, an arithmetic module 14, a memory module 15 and an editing module 16, wherein the mode of operation of these modules corresponds to the mode of operation of the corresponding modules of the first source database 1. A large number of such source databases are currently connected to the Internet NET and store the most varied types of entry data EI, such as for example product information about products, technical product data, customer data, date data or quality data.

The source databases 1, 2 and 3 are similar to one another with regard to their content, since the source databases 1, 2 and 3 store similar entry data EI about in part the same television broadcasts. The electronic program guide stored in the first source database 1 is provided for German users and contains the television programs to be broadcast by television stations receivable in Germany, such as for example ARD, ZFD and Bayrischer Rundfunk. The electronic program guide stored in the second source database 2 is provided for Austrian users and contains the television programs to be broadcast by television stations receivable in Austria, such as for example ORF1, ORF2 and ARD. The electronic program guide stored in the third source database 3 is provided for Swiss users and contains the television programs to be broadcast by television stations receivable in Switzerland, such as for example SW1, SW2 and ARD.

The proprietors of the target database 4 would like to provide an electronic program guide usable by users from Germany, Austria and Switzerland and which contains the television programs to be broadcast by television stations receivable in these countries. For this purpose, the target database 4 is designed to gather automatically the entry data EI stored in the three similar source databases 1, 2 and 3.

To make this possible, the target database 4 comprises an interface 17, a temporary storage module 18, an arithmetic module 19, a memory module 20 and an editing module 21. The target database 4 takes the form of a computer, which runs software with which the computer is designed to gather entry data EI and to notify an administrator of one of the source database 1, 2 or 3 of incorrect data records of the source database 1, 2 or 3 for which the administrator is responsible.

The method of operation of the target database 4 is explained in more detail with reference to an example of application of the system according to FIG. 1. According to the example of application, it is assumed that, in the memory module 7 of the first source database 1, entry data EI relating to the television broadcasts receivable over the next week from the television stations ARD, ZFD and Bayrischer Rundfunk are stored in first data records, an extract of which is illustrated in Table 1.

TABLE 1

(first source database):

| Station | Date | Start time | Title |
|---|---|---|---|
| ... | ... | ... | ... |
| ARD | 13 May, 2001 | 16:00 | Universum |
| ARD | 13 May, 2001 | 16:45 | Adverts |
| ARD | 13 May, 2001 | 17:00 | Casablanca |
| ... | ... | ... | ... |

Table 1 contains data record entries under data record entry identifiers "station", "date", "start time" and "title" for each data record of a television broadcast. According to the example of application, it is further assumed that, in the memory module 11 of the second source database 2, entry data EI relating to the television broadcasts receivable over the next week from the television stations ORF1, ORF2 and ARD are stored in second data records, an extract of which is illustrated in Table 2.

TABLE 2

(second source database):

| Station | Date | Start time | Rating: | Title |
|---|---|---|---|---|
| ... | ... | ... | ... | ... |
| ARD | 13 May, 2001 | 16:00 | 1 | Universum |
| ARD | 13 May, 2001 | 16:45 | — | Adverts |
| ARD | 13 May, 2001 | 17:30 | 3 | Casablanca |
| ARD | 13 May, 2001 | 20:00 | 2 | Sport (Formula 1) |
| ... | ... | ... | ... | ... |

In addition to the data entry identifiers contained in Table 1, Table 2 also contains a data record entry under the data record entry identifier "rating" for each data record of a television broadcast, which identifies how worth seeing the television broadcast is. According to the example of application, it is further assumed that, in the memory module 15 of the third source database 3, entry data EI relating to the television broadcasts receivable over the next week from the television stations SW1, SW2 and ARD are stored in third data records, an extract of which is illustrated in Table 3.

TABLE 3

(third source database):

| Station | Date | Start time | Title | Content |
|---|---|---|---|---|
| ... | ... | ... | ... | ... |
| ARD | 13 May, 2001 | 16:00 | Universum | A hare is... |
| ARD | 13 May, 2001 | 16:45 | Adverts | — |
| ARD | 13 May, 2001 | 17:00 | Casablanca | Old but good... |
| ARD | 13 May, 2001 | 20:00 | Sport (Formula 1) | The fastest... |
| ... | ... | ... | ... | ... |

In addition to the data record entry identifiers contained in Table 1, Table 3 also contains a data record entry under the data record entry identifier "content" for each data record of a television broadcast, which gives a brief description of the content of the respective television broadcast. The arithmetic module 19 of the target database 4 is designed to gather the entry data EI stored in the source databases 1, 2 and 3, as is described below.

For this purpose, the arithmetic module 19 is designed to feed Internet address data IAI to the interface 17, which data contain the Internet addresses of the three source databases 1, 2 and 3. The interface 17 is designed then to retrieve and receive the entry data EI of the first data records, the second data records and the third data records from the source databases 1, 2 and 3. The retrieved entry data EI are stored in the temporary memory module 18.

The arithmetic module 19 is then designed to compare the data record entries of the data records stored in the temporary memory module 18. During this process, the arithmetic module 19 establishes that the data records stored in the third rows of Tables 1, 2 and 3 contain matching data record entries "ARD", "13 May 2001", "16:00" and "Universum" for the matching data record entry identifiers "station", "date", "start time" and "title". The arithmetic module 19 is designed then to tag these similar first, second and third data records. This tagging is effected by an additional entry in a further column in the Tables 1, 2 and 3 stored in the temporary memory module 18.

The arithmetic module is designed to enter the data record entries contained in tagged similar first, second and third data records into a new data record in the memory module 20 of the target database 4, if matching data record entries for all matching data record entry identifiers are contained in the similar first, second and third data records. A new data record is stored in the memory module 20, which contains all the data record entries contained in the three matching data records, as shown in Table 4 in the manner of an extract.

TABLE 4

(target database)

| Station | Date | Start time | Title | Rating: | Content |
|---|---|---|---|---|---|
| ... | ... | ... | ... | ... | ... |
| ARD | 13 May, 2001 | 16:00 | Universum | 1 | A hare is... |
| ARD | 13 May, 2001 | 16:45 | Adverts | — | — |
| ARD | 13 May, 2001 | 17:00 | Casablanca | 3 | Old but good... |
| ARD | 13 May, 2001 | 20:00 | Sport (Formula 1) | 2 | The fastest... |
| ... | ... | ... | ... | ... | ... |

In this way, the advantage is achieved that the target database 4 fully automatically fetches current entry data EI from the three source databases 1, 2 and 3 and establishes which of the entry data EI are definitely correct, since these are entered concurrently in all the source databases 1, 2 and 3. Such entry data EI are advantageously entered automatically into the target database 4.

The new data record contained in the third row of the target database contains both the matching data record entries contained in the similar data records for the matching data record entry identifiers "station", "date", "start time" and "title" and the data record entry contained only in the second data record for the data record entry identifier "rating" and the data record entry contained only in the third data record for the data record entry identifier "content".

In this way, the advantage is achieved that all the entry data EI contained in the source databases 1, 2 and 3 with regard to a television broadcast are gathered together, so that the user of the target database 4 may be provided with the most extensive information possible.

The arithmetic module 19 is further designed to tag similar first and second data records as error data records, if the similar first and second data records comprise a different data record entry for at least one matching data record entry identifier. For example, the data records stored in the fifth row of Table 1 and Table 2 in relation to the television broadcast "Casablanca" are similar data records, since the data record entries stored for the data record entry identifiers "station", "date" and "title" match. However, these similar first and second data records comprise the different data record entries "17:00" and "17:30" for the matching data record entry identifier "start time". The arithmetic module 19 is designed to tag these first and second data records as error data records and to generate a first error flag FI1 identifying the tagged error data records.

In this way, the advantage is achieved that substantially matching data records which thus highly probably relate to the same television broadcast but which differ in at least one data record entry comprising a matching data record entry identifier are tagged with the first error flag FI1. The administrator of the target database 4 has thus to check only the data records tagged with the first error flag FI1 as to which of the two different data record entries is correct. For this purpose, the first error flag FI1 is fed to the editing module 21, with which the administrator of the target database 4 may edit incorrect data records stored in the temporary memory module 18 or the memory module 20.

The arithmetic module 19 is designed to search for third data records similar to the first and second data records tagged as error data records, said third data records being received from the third source database 3. The arithmetic module 19 then finds the third data record entered in the fifth row of Table 3, which is similar to the error data records, since this third data record contains the same data record entries for the matching data record entry identifiers "station", "date" and "title". The arithmetic module 19 is designed to tag this third data record contained in the fifth row of Table 3 as a similar data record to the error data records entered in the fifth rows of Table 1 and Table 2.

The arithmetic module 19 is further designed to compare the different data record entries contained in the first and second data records tagged as error data records with the data record entry contained in the tagged third data record, in order to establish by the majority principle (the majority are right) which data record entry "17:00" or "17:30" is correct. The arithmetic means 19 establish that the start time "17:00" is entered in the first and third data records, whereupon the arithmetic means 19 are designed to enter the data record entry contained in the tagged third data record into a new data record in the target database 4.

In this way, the advantage is achieved that the arithmetic module 19 automatically establishes which of the error data records contains the correct data record entry, whereupon this correct data record entry is then entered into the target database. Thus, in such cases it is also possible to dispense with manual entry by the administrator of the target database 4, whereby processing costs are saved. However, such data records of the target database 4 initially tagged as error data records could be identified for the administrator of the target database 4 in order to allow specific checking of the data record entries by the administrator.

It may be mentioned that the arithmetic module 19 could also actively search for source databases on the Internet NET and fully automatically retrieve and compare corresponding data records similar to the error data records only after the fact is established that error data records are present. In this way, high-quality entry data EI may be fully automatically fetched from source databases and assembled in the target database, because the quality of the data records ultimately entered in the target database 4 is higher than that of the source databases due to the comparison of the data record entries from different source databases and entry in accordance with the majority principle.

The arithmetic module 19 is further designed to generate a second error flag FI2, which identifies the first or second data record, tagged as an error data record, which comprises at least one different data record entry for matching data record entry identifiers of the tagged third data record. Thus, the data record fetched from the second source database 2 and contained in the fifth row of Table 2 is tagged with the second error flag FI1, since the start time "17:30" of the television broadcast entitled "Casablanca" is obviously wrong.

The target database 4 is further designed to transmit this second error flag FI1 to the administrator of the second source database 2, from which the incorrect data record was received. For this purpose, the arithmetic module 19 feeds the second error flag FI2 to address means 22 of the target database 4. The address means 22 store address data AI relating to the administrators of the respective source databases. The address data AI relating to the administrator of the first source database 1 comprises a fax number "+43 (1) 22 33 44", that for the administrator of the second source database 2 comprises an email address "Hans.Mueller@Datenbank.at" and that for the administrator of the third source database 3 a postal address "A-1120 Vienna, Maygasse 12".

According to the example of application, the address means 22 receive the second error flag FI2 tagging the incorrect data record of the second source database 2 and feed the second error flag FI2 together with the email address of the administrator of the second source database 2 to the interface 17. The interface 17 sends a corresponding email over the Internet NET to the interface 9 of the second source database 2, which feeds the second error flag FI2 to the editing module 12.

In this way the advantage is achieved that the administrator of the second source database 2 is pointed to an incorrect data record in the second source database 2 for which he/she is responsible and may repair the latter. The quality of the entry data EI of the second source database 2 for which the administrator is responsible is therefore increased, for which reason more and more users will use this source database 2. This larger number of users of the source database 2 has considerable advantages for the proprietors of the source database 2 either due to increased database utilization fees or due to increased advertising income.

The target database 4 is further designed to transmit billing information RI to the administrators of the source databases 1, 2 or 3, from which the data record tagged with the second error flag FI2 was received, in order to charge for the service of notification of incorrect data records in the source database 1, 2 or 3 for which the administrator is responsible. Bills are transmitted for example weekly or monthly to the administrators of the source databases 1, 2 and 3.

In this way, a business method is advantageously obtained, according to which an appropriate notification fee is charged for notification of incorrect data records in the source databases 1, 2 and 3. The proprietors of the source databases will be happy to pay this notification fee, since, due to notification of incorrect data records in their source databases, the proprietors are able to reduce the working time of the source database administrators, who no longer have to check the validity of the data records entered in the source databases. In addition, the source database proprietors increase their revenue due to the improved quality of the entry data EI, as described above.

If a database utilization fee has to be paid for retrieval of the source database data records, the proprietors of the source databases 1, 2 and 3 and the proprietors of the target database 4 could then agree to allow the data records of the source databases 1, 2 and 3 to be retrieved by the target database 4 for free, no notification fee then being charged in return. In this way, a very advantageous business method would likewise be achieved.

It may be mentioned that entry data could also be retrieved from five similar source databases for example, in order to compare similar data records in these entry data and enter new data records into the target database in accordance with the majority principle. Similarly, for example, the target database could check once daily whether the similar data records currently entered in the source databases would lead, in accordance with the majority principle, to a different data record from the data record already entered in the target database. If this were the case, this target database data record then recognized by the majority principle as an incorrect data record could be overwritten by the correct data record.

It may be mentioned that in particular VPS (Videorecorder Programming System) identifiers, which are used to activate video-recorder recording mode, are often changed at short notice and updating of this information in the target database is particularly important. According to the invention, a considerable advantage is thus achieved especially in the case of such sensitive information by the improvement in the quality of the data record entries and by regular updating of the data record entries in the target database.

It may be mentioned that the source databases and the target database could also be connected via any other data network/telephone network.

It may be mentioned that the target database could search automatically for similar source databases using a search engine connected with the Internet through the input of search words and use them for retrieval of similar entry data.

It may be mentioned that similarity between two source databases may be established on the basis of how many data record entry identifiers match between the two source databases. Thus, two source databases, which contain for example entry data EI for each of 30 data record entry identifiers, wherein only five of the 30 data record entry identifiers match between the two source databases, may likewise be designated similar source databases. In this case, only the entry data EI entered for the five matching data record entry identifiers would be evaluated when checking which entry data EI are correct according to the majority principle. However, depending on the purpose of the target database, all the entry data EI entered in the source databases for the 30 data record entry identifiers could also be entered into the target database.

What is claimed is:

1. A method of gathering entry data for a target database, which contains data records with data record entries related to data record entry identifiers, from at least two source databases similar to one another in content, which source databases contain substantially the same entry data in data records with at least partially matching data record entry identifiers, the method comprising:

reception of first data records from a first source database and of second data records from a second source database;

tagging of similar first and second data records, which exhibit substantially matching data record entries for matching data record entry identifiers and thus substantially identify the same entry data;

entry of data record entries contained in tagged similar first and second data records into a new data record in the target database, if matching data record entries for all matching data record entry identifiers are contained in the similar first and second data records;

tagging of similar first and second data records as error data records, if the similar first and second data records comprise at least one different data record entry for a matching data record entry identifier;

generation of a first error flag identifying the tagged error data records.

2. A method as claimed in claim 1, further comprising:

reception of third data records from a third source database similar in content to the first and second databases;

tagging of a third data record similar to the first and second data records tagged as error data records, which third data record comprises data record entries matching one of the two error data records for all the matching data record entry identifiers;

entry of the data record entries contained in tagged third data records into a new data record in the target database.

3. A method as claimed in claim 2, further comprising:

generation of a second error flag, which identifies the first or second data record, tagged as an error data record, which comprises at least one different data record entry for matching data record entry identifiers of the tagged third data record.

4. A method as claimed in claim 3, further comprising:

transmission of the second error flag identifying the first or second data record to an administrator of the first or second source database respectively.

5. A method as claimed in claim 4, further comprising:

transmission of billing information to the administrator of the first or second source database, in order to charge for the service of notification of incorrect data records in the source database for which the administrator is responsible.

6. The method of claim 2, wherein manual entry is eliminated as a result of the method.

7. A method as claimed in claim 1, further comprising:

retrieval of the first data records and/or the second data records and/or the third data records from the first source database, second source database and third source database connected with the Internet.

8. A method as claimed in claim 1, wherein the source databases comprises electronic program information and one item of entry data in each case identifies one television broadcast.

9. A computer software product, which may be loaded directly into the internal memory of a digital computer and comprises portions of software code, wherein the method as claimed in claim 1 is executed by the computer if the product is running on the computer.

10. A computer software product as claimed in claim 7, wherein the computer software is stored on a computer-readable medium.

11. A computer having an arithmetic unit and an internal memory, which runs the computer software product as claimed in claim 7.

12. The computer software product of claim 9, wherein the source databases comprise information regarding content to be experienced by a user and the target database comprises an electronic program guide.

13. The computer software product of claim 12, wherein the first and second source databases comprise information intended for users from respective first and second distinct geographical regions associated with the first and second source databases, respectively, and the target database contains information intended for users from all the respective distinct geographical regions associated with all the source databases.

14. The computer software product of claim 13, wherein at least one of the source databases comprises information received from at least one television station located in the respective distinct geographical region associated with that database.

15. The computer software product of claim 14, wherein the data record identifiers comprise fields identifying one or more of: station, date, time, and title.

16. The method of claim 1, wherein the source databases comprise information regarding content to be experienced by a user and the target database comprises an electronic program guide.

17. The method of claim 16, wherein the first and second source databases comprise information intended for users from respective first and second distinct geographical regions associated with the first and second source databases, respectively, and the target database contains information intended for users from all the respective distinct geographical regions associated with all the source databases.

18. The method of claim 17, wherein at least one of the source databases comprises information from at least one television station located in the respective distinct geographical region associated with that database.

19. The method of claim 18, wherein the data record identifiers comprise fields identifying one or more of: station, date, time, and title.

20. A method of notifying a source database administrator of incorrect data records in the source database for which he or she is responsible, the method comprising:

reception of at least first data records from a first source database, of second data records from a second source database and of third data records from a third source database;

tagging of similar data records from the at least first, second and third data records which exhibit substantially matching data record entries for matching data record entry identifiers and thus substantially identify the same entry data;

generation of a second error flag, if the majority of the data records tagged with regard to one item of entry data contain matching data record entries for all the matching data record entry identifiers, wherein the second error flag identifies at least one of the at least three data records as an incorrect data record, which at least one comprise at least one different data record entry compared with the other data records for matching data record entry identifiers of the tagged data records.

21. A method as claimed in claim 20, further comprising:

transmission of the second error flag tagging at least one incorrect data record to the administrator or administrators of the source database or databases from which the data record tagged with the second error flag was received.

22. A method as claimed in claim 21, further comprising:

transmission of billing information to the administrator or administrators of the source database or databases, from which the data record tagged with the second error flag was received, in order to charge for the service of notification of incorrect data records in the source database for which the administrator or administrators is or are responsible.

23. The method of claim 20, wherein the source database comprises information regarding content to be experienced by a user.

24. The method of claim 23, wherein transmission comprises sending a fax to the administrator.

* * * * *